J. B. BARTHOLOMEW.
GEARING FOR TRACTION ENGINES.
APPLICATION FILED OCT. 21, 1899.
929,183.
Patented July 27, 1909.
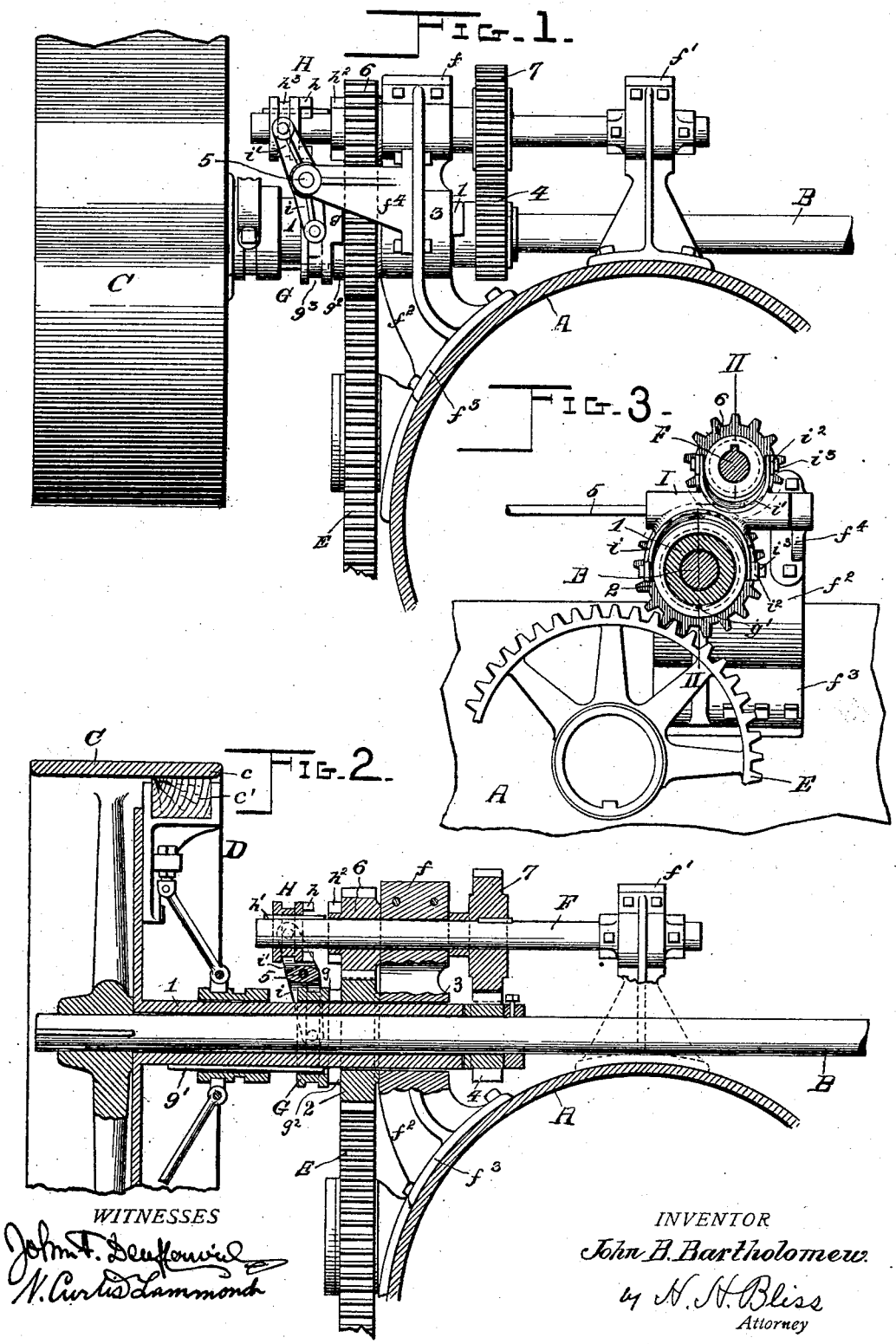
WITNESSES
INVENTOR
John B. Bartholomew.
by N. H. Bliss
Attorney

UNITED STATES PATENT OFFICE.

JOHN B. BARTHOLOMEW, OF PEORIA, ILLINOIS, ASSIGNOR, BY MESNE ASSIGNMENTS, TO AVERY COMPANY, A CORPORATION OF ILLINOIS.

GEARING FOR TRACTION-ENGINES.

No. 929,183.          Specification of Letters Patent.          Patented July 27, 1909.

Application filed October 21, 1899. Serial No. 734,369.

*To all whom it may concern:*

Be it known that I, JOHN B. BARTHOLOMEW, a citizen of the United States, residing at Peoria, in the county of Peoria and State of Illinois, have invented certain new and useful Improvements in Gearing for Traction-Engines, of which the following is a specification, reference being had therein to the accompanying drawing.

In order to make my invention more clearly understood I have shown in the accompanying drawings means for carrying the same into practical effect, without limiting my improvements, in their useful applications, to the particular constructions which, for the sake of illustration, I have delineated.

In said drawings—Figure 1 is a front elevation of a gearing embodying my invention, applied for the purpose of actuating the driving or traction mechanism of a traction engine, such portion of the latter being illustrated as is necessary for an understanding of the invention. Fig. 2 is a sectional view of the same on a plane transverse to the engine, on line II—II, Fig. 3. Fig. 3 is a side elevation, partly in section.

Referring to the drawings A indicates the body of the engine and B the transverse power shaft driven by any suitable mechanism and mounted in bearings 3 supported from the body of the engine. Fixed on the shaft B is a fly wheel C adapted to be connected with the traction gearing by a friction clutch D of any usual or suitable construction. As illustrated one member of said clutch is constituted by or is attached to the rim of the fly wheel C and is indicated at $c$. The other member $c'$ is connected with a sleeve or hollow shaft 1 which is loose on the shaft B, in such manner that the parts constituting the clutch member $c'$ can, by any usual or suitable appliances, be caused to engage the member $c$ to cause the rotation of the sleeve with the shaft, or can be released from the clutch member $c$ in which case the shaft and fly wheel can turn freely relative to said sleeve. On the sleeve 1 is loosely mounted a pinion 2 which engages and is adapted to drive the train of gears, or other traction mechanism E through which power is communicated to the ground wheels of the engine. Said sleeve passes through one of the bearings or boxes 3, in which it is adapted to turn, and beyond said box is connected with or has fixed upon it a pinion 4 of a different diameter or pitch from the pinion 2. As illustrated the pinion 4 is the smaller.

The pinion 4 may be rigidly secured to the sleeve 1 in any well known manner. In the drawings, for illustration I have shown the outer hub of the pinion provided with an ordinary clutch jaw which engages with an oppositely arranged jaw on the sleeve 1, these jaws being held in engagement by a collar which is rigidly secured to the shaft B.

F is a counter-shaft, mounted in bearings $f$, $f'$ supported from the body of the engine, and parallel with the shaft B. Preferably the bearing $f$ is formed with the bearing or box 3 and both are carried by a bracket $f^2$ having a base plate $f^3$ fixed upon the engine body or boiler.

6 and 7 are pinions on the shaft F and corresponding in size with the pinions 2 and 4; that is to say where the pinion 4 is smaller than the pinion 2 the pinion 7 may be larger than the pinion 6, so that the pinions 6 and 7 may engage the pinions 2 and 4 for the actuation of the traction gearing E at either of two different speeds as hereinafter more fully explained. The pinion 7 is fixed upon the shaft F so as to drive the same, and the pinion 6 is loose upon the shaft.

G indicates a clutch one member $g$ of which engages the sleeve 1, as by means of a spline $g'$, so as to move longitudinally upon the sleeve but be rotated thereby, while the other member $g^2$ is formed with or attached to the pinion 2. H is a second clutch having one member $h$ longitudinally movable upon the shaft F and engaged to be rotated therewith by a spline $h'$ and having its other member $h^2$ formed with or attached to the loose pinion 6.

With the above described construction it will be observed that, according to the positions of the clutches G and H, the shaft B with its fly wheel can while rotating be connected with the traction mechanism at either of two different speeds, or that a change may be made from one speed to another. Thus, when the parts are in the positions shown in Fig. 1, the members of the clutch G being in engagement with each other, the sleeve 1 is connected with the pinion 2, and when the friction clutch D is caused to connect the power shaft and fly wheel with said sleeve the traction gearing can be started directly through the pinion 2 at a relatively high speed. On the other hand when the parts are in the reverse position the members of the clutch H being engaged with each other and those of the clutch G disengaged, the sleeve 1 will be connected with the pinion 2 and with the traction gearing through the media of the pinion 4, the pinion 7, the shaft F, the clutch H and the pinion 6, enabling the engine, when the friction clutch D is thrown into engagement, to be started at a relatively low speed but with greater power. In the last mentioned position of the parts the pinion 2 acts merely as an idler in the system of gearing. In the other position (Fig. 1) the pinion 7 and shaft F will rotate with the pinion 4, but the pinion 6 will rotate loosely to correspond with the speed of the pinion 2.

While the clutches G and H may be independently or separately operated I prefer to combine with them a mechanism whereby they are operated together but alternately, as will now be described.

5 is a rock shaft constituting a shifting shaft for the clutch members $h$ and $g$. It is conveniently mounted at one end in a bracket bearing $f^4$ bolted to the bracket $f^2$, and extends, or has suitable connections which extend, to within convenient reach of the engine driver.

I is a double fork or yoke fixed upon the shaft 5 and having arms $i$, $i'$ which are connected respectively with the clutch members $g$ and $h$. It will be seen that the rotation or rocking of the shaft 5 may cause the members of the clutch G to engage with each other and those of the clutch H to be disengaged, or vice versa, or that in an intermediate position the clutch members $g$ and $h$ may both be held out of engagement. Any suitable means may be provided for holding the shifting shaft 5 in the position to which it may be adjusted.

In the construction shown the connections of the arms $i$, $i'$ with the clutch members are effected by means of shoes or rings $i^2$ engaging grooves $g^3$, $h^3$ in the clutch members and engaged by pivot bolts $i^3$ in the fork arms.

The wheel C constitutes a clutch element driven with the engine shaft, the corresponding and second clutch element comprises the parts from $c'$ to 1, and the wheels 4, 7, 6 and 2 and the clutch mechanism G, H constitutes means for connecting the traction mechanism with the second clutch element at will either directly or indirectly for giving different speeds to the traction mechanism.

Heretofore great difficulty has been experienced from the strains and shocks incident to changing speeds in traction engines, and many efforts have been made to devise a means for utilizing the momentum of the power mechanism, in connection with the traction gearing, to change speed while in motion or to start with either desired speed and relative power without subjecting the engine to such strains and shocks. I have accomplished the desired end by my improvements, as will be readily understood from the foregoing description and illustration, at the same time providing fully for the free operation of the power mechanism independent of the traction mechanism when the engine is used as a stationary source of power, as in threshing.

When the parts are constructed and arranged substantially as shown it will be seen that I provide the engine shaft and the traction gearing with a set of parts which may be considered as comprising essentially two continuously connected wheels such as those at 2 and 4, and which are connected (one immediately and the other mediately) with the traction gearing, and a shaft which is interposed between the said wheels and the engine shaft, this interposed shaft transferring efficient power alternately to the said two wheels, together with a friction clutch which connects the interposed shaft and the engine shaft; and so long as these features of construction and relationship are maintained it is not necessary that all of the details which I have shown and described be retained.

One of the objects of the present invention is to permit the use of a traction vehicle provided with a steam engine of relatively low engine power, but which can be so used as to supply the engineer for short periods of time with a greatly enhanced power, he having at his immediate control devices by which he can take that power off more or less suddenly or gradually as occasion demands. It will be seen that the engine shaft B and the fly wheel C can be entirely free from engagement with the other parts, this being the case when the friction clutch is loosened. At such time the engine can be speeded up to make available the extra power referred to.

I employ a fly wheel at C weighing from six hundred to seven hundred pounds. The engine has its parts adjusted in such way that the normal speed of rotation of the crank shaft is about two hundred and fifty revolutions a minute, and it can be assumed that the power of the engine is normally ten horse power. But the engineer can at any time control the valves so as to increase this speed when the crank shaft is disengaged from the gearing. If he speeds the shaft from two hundred and fifty up to three hundred revolutions a minute he stores in the fly wheel an energy equivalent to forty-five horse power, supplemental to the normal current steam power of the engine. That is to say, it approximates forty-five horse power of momentum energy if it is taken off by retardation during the period of one second. And when the higher speed gearing (which is the train commonly in use) is in action the tendency is to take off this great increase in power suddenly. But if the vehicle be stalled, as for instance if one of the ground wheels be deeply depressed in a rut or be stopped against a relatively high obstruction it is disadvantageous and often disastrous to transmit this excessively high momentum energy down through the high speed gearing because of the suddenness of the transmission. Hence it becomes desirable to distribute the application of this heightened horse power through several seconds of time in order that the great inertia of the heavy vehicle as a whole may be overcome and the depressed or stalled wheel raised under the great weight to the top of the obstruction. With the devices I have provided, assuming that the six hundred pound fly wheel has been put into a rotation of three hundred revolutions a minute, I can in four seconds of time with the slower speed gearing apply during the first second twenty horse power, during the next second fourteen horse power, during the third second eight horse power and during the fourth second three horse power, and this or the principal part of it being supplemental to the current steam power that is being generated in the cylinder of the engine. Consequently I am enabled to extricate the engine at times and under circumstances where it is impossible or very difficult to extricate it with the ordinary speed gear intended for traveling upon average good roads.

In accomplishing the results here referred to, when the engine is stalled with a depressed or obstructed wheel and it becomes necessary to lift the seven to ten tons of metal, the engineer first throws out the friction clutch, then speeds up his fly wheel and engine, then connects the clutch mechanism with the slow speed gear while all of the positive or toothed clutched parts are stationary, then brings the friction clutch into engagement with the highly energized momentum wheel and transmits the stored energy in such way as to apply it to the utmost advantage in overcoming the obstruction or elevating the machine from a depression. Having accomplished this he may again restore the gearing to its normal adjustment.

In the present construction the interposed shaft 1 is tubular or sleeve-like as above described and loosely mounted upon the engine shaft, but nevertheless for the purposes thereof it is to be regarded as a shaft intermediate of the engine shaft and the wheels 2 and 4, and I do not limit myself to the exact details of its construction and arrangement herein shown.

Of course I am aware of the fact that various plans have been followed or proposed for effecting the changing of the speed of the traction gearing of engines; but so far as I am aware, and notwithstanding the well known desirability, no sucessful mechanism has been yet devised whereby the changing of the speed of the traction gearing could be effected in such way as not to lose the assistance derivable from the momentum of the engine proper (the fly wheel, shaft, &c.) and of the vehicle (the boiler, traction wheels, &c.) in maintaining the motion of the vehicle and avoiding the necessity of starting from a position of dead rest after the change in speed gearing has been effected.

Serious difficulties have been experienced in employing in traction engines a friction clutch next to the power mechanism together with speed changing gearing, which I have overcome by employing in connection with the friction clutch a supplemental clutching mechanism which is independent of the engine shaft except through the medium of the friction clutch, and which permits me to transmit the power from the friction clutch to either of two differently speeded gearings for actuating the traction mechanism.

The connection between the pinion 4 and the sleeve 1 is by means of a clutch as shown, or other readily separable connection, allowing the pinion to be withdrawn from the sleeve, or from both the sleeve and the pinion 7.

I herein refer to the fact that there are two trains of devices for connecting at will the loose gear wheel to the hollow shaft or sleeve which surrounds the engine shaft B for transmitting different speeds to the traction gear, one of said trains comprising the fork arm $i$, the hub $g$, the spline $g'$, the teeth on the hub and the teeth $g^2$ on the gear 2, and the other train comprising the fork arm $i'$, the hub $h$, the teeth on the hub, the teeth $h^2$, the wheel 6, the shaft F, the wheel 7 and the wheel 4.

What I claim is:—

1. In a gearing for traction engines, the combination with the single driven traction gear, and the engine shaft, of two gear wheels supported by the engine shaft and rotating around the axis thereof, one of said two gear wheels meshing directly with said traction gear, and means for transmitting power to said meshing gear wheel from the said shaft at will, either from or independently of the other of said gear wheels.

2. In a gearing for traction engines, the combination with the engine shaft, and the traction gear, of the sleeve on the engine shaft, the countershaft, the loose wheel on the sleeve meshing with the traction gear, the wheel rigidly connected with the sleeve, the loose wheel on the countershaft meshing with the loose wheel on the sleeve, the wheel rigid on the countershaft meshing with the wheel rigid on the sleeve, the clutches for connecting the loose wheels to the sleeve and the countershaft respectively, and the clutch for connecting the engine shaft to the sleeve, substantially as set forth.

3. In a gearing for traction engines, the combination of the traction gear, the engine shaft, two pairs of speed gears, and clutch mechanism, each pair of said gears having a wheel on the axis of the engine shaft which wheels are rotatable independently of each other, said clutch mechanism being operative for connecting the said wheels with the traction gear, and the friction clutch interposed between said shaft and said gears.

4. The combination of the engine shaft B, a fly wheel C fixed thereon, a gear wheel 2 on the engine shaft, a positive clutch for said wheel 2, a friction clutch having means for connecting said positive clutch with the engine shaft, and a gear wheel 4 on said shaft, the wheel 4 being detachably connectible with the traction mechanism.

5. The combination of the crank shaft B, the fly wheel C fixed thereon, traction gear having a wheel E, two gear wheels on the axis of the engine shaft, means whereby power is transmitted to the wheel E through both of said wheels or through one of said wheels independently of the other, and the friction clutch operatively interposed between said two wheels and the engine shaft.

6. The combination of the engine shaft, a traction gear, two independent gear wheels on the engine shaft, capable of different peripheral speeds, a fly wheel secured to the shaft which supports said wheels, a friction clutch interposed between the shaft and the said wheels, and an intermediate gearing between the said gear wheels, substantially as set forth.

7. In a gearing for a traction engine, the combination of the engine shaft, the sleeve or hollow shaft loosely mounted thereon, the friction clutch interposed between the engine shaft and the sleeve, the traction gear wheel and means whereby said hollow shaft is connectible at will with said traction gear to impart different speeds thereto, substantially as set forth.

8. In a gearing for traction engines, the combination of the engine shaft, the sleeve or hollow shaft mounted loosely thereon, the friction clutch interposed between the sleeve and the engine shaft, the loose wheel on the sleeve relatively near the friction clutch, a second wheel rigidly secured to the sleeve relatively remote from the clutch, the traction gear connected directly to the loose wheel and means for connecting with said loose wheel the aforesaid wheel secured rigidly to the sleeve for driving said loose wheel with a speed different from that of the sleeve, substantially as set forth.

9. In a gearing for a traction engine, the combination of the engine shaft, the sleeve or hollow shaft loosely mounted on the engine shaft, means for causing the engine shaft and hollow shaft to rotate together, a fast wheel and a loose wheel on said sleeve, the traction gear connected with one of the wheels on the sleeve, and means substantially as set forth comprising a clutch mechanism interposed between the other wheel on the sleeve and the wheel which is connected with the traction gear, whereby either of two speeds can be imparted to said gear from the sleeve.

10. In a gearing for a traction engine, the combination of a power shaft, a clutch, one member of which is connected with said shaft, a sleeve on said shaft, connected with the other member of said clutch, a countershaft having a fixed pinion and a loose pinion of different pitches, a pinion connected with said sleeve and engaging the fixed pinion on the countershaft, a wheel loose on said sleeve and connected with a traction gearing and engaging the loose pinion on said countershaft, and means for connecting and disconnecting said loose pinions with and from said sleeve and countershaft respectively, substantially as set forth.

11. The combination of the shaft B, the sleeve 1 loosely mounted thereon, the fast and loose pinions 4 and 2 on said sleeve, the countershaft F, the fast and loose pinions 7 and 6 thereon, and engaging respectively the first mentioned pinions, the clutches G and H, the rock shaft 5 adapted to shift said clutches, the fly wheel C, and a friction clutch adapted to connect the latter with the shaft B, substantially as set forth.

12. The combination of the traction engine body, the crank shaft above and supported on said body, the countershaft above said body and supported thereon, a driven gear at the side of said body for actuating the traction mechanism, two sets of differently speeded wheels on said shaft and countershaft, and clutch mechanism connecting certain of said wheels with the engine shaft and with the countershaft as described, whereby said driven gear may be operated through said countershaft at one speed and from the engine shaft independently of the countershaft at another speed.

13. In a gearing for a traction engine, the combination of the driven traction gear E, the engine shaft, two gear wheels supported by the engine shaft and rotating around the axis thereof, one of said gear wheels meshing with said wheel E, and means for operatively connecting said meshing gear wheel with the engine shaft either directly at one speed or indirectly at another speed, at will, substantially as set forth.

14. In a gearing for traction engines, the combination of the main engine shaft, a second shaft, a clutch mechanism for connecting and disconnecting said main and second shafts, a third shaft, gearing connecting said second and third shafts to run at different speeds, a traction mechanism, and means for operatively connecting at will said traction mechanism either with said second shaft or with said third shaft, substantially as set forth.

15. In a gearing for traction engines, the combination of the main engine shaft, a second shaft, a clutch mechanism for connecting and disconnecting said main and second shafts, a third shaft, gearing connecting said second and third shafts to run at different speeds, a traction mechanism, and means for operatively connecting at will said traction mechanism either with said second shaft or with said third shaft, one of said shafts being hollow and inclosing another of said shafts, substantially as set forth.

16. A traction engine having a fly-wheel, a friction clutch element carried therewith, an engine shaft attached to said fly-wheel, a second friction clutch element operatively free from said shaft and engageable with the first mentioned clutch element, differently speeded gearings having members concentric with said shaft, a countershaft carrying other members of said gearings, a traction mechanism, and means for causing power to be transmitted from said second friction clutch element to said traction mechanism through said countershaft or independently thereof at will, substantially as set forth.

17. In a gear for traction engines, the combination of the engine shaft, the sleeve or hollow shaft loosely mounted thereon, the friction clutch interposed between the engine shaft and the sleeve, the gear loose on the said sleeve, the traction wheel meshing with the said loose gear, and means whereby said hollow shaft may be connected at will with the said traction gear through said loose gear to impart different speeds thereto, substantially as set forth.

18. In a gear for traction engines, the combination of the engine shaft, the sleeve or hollow shaft loosely mounted thereon, the friction clutch interposed between the engine shaft and the sleeve, the gear loose on said sleeve, the traction gear wheel meshing with the said loose gear, and two trains of devices for connecting at will the said loose gear to the said hollow shaft to impart different speeds to the traction gear.

19. In a gear for traction engines, the combination of the engine shaft, the sleeve or hollow shaft loosely mounted thereon, the friction clutch interposed between the shaft and the sleeve, the gear loose on the said sleeve, the traction gear meshing with the said loose gear, the set of supplemental gears adapted to connect the said hollow shaft with the said loose gear, and the double-acting clutch whereby the said hollow shaft may be connected at will either directly to the said loose gear or indirectly thereto through the set of supplemental gears, substantially as set forth.

20. In a traction engine, the combination of a momentum storing fly wheel, a friction clutch, one element of which is carried by the fly wheel, an engine shaft rigidly attached to the said fly wheel, a sleeve or hollow shaft loosely mounted on the said engine shaft and carrying the second element of the friction clutch, a gear loose on the said sleeve, the traction mechanism adapted to be driven by the said gear, and means for causing power to be transmitted from the said second friction clutch element to the said traction mechanism through said loose gear at different speeds, substantially as set forth.

21. In a traction engine driving mechanism, the combination of the engine shaft, the sleeve or hollow shaft thereon, the friction clutch interposed between the engine shaft and the sleeve, said clutch having one element connected to the engine shaft and the other element slidably mounted on the sleeve, the traction gear wheel, and means whereby said hollow shaft can be connected to the traction gear to impart at will either of two different speeds, substantially as set forth.

22. In a traction engine gearing, the combination of an engine shaft, a train of relatively high speeded power transmitting devices comprising a shaft and a wheel loosely mounted thereon, a train of low speeded power transmitting devices interposed between the said shaft and the loose wheel thereon and comprising a supplemental shaft and a gear wheel loose thereon, two oppositely acting positive clutches, one mounted on each of the said shafts and adapted to connect respectively with the loose wheels thereupon, and a friction clutch interposed between the engine shaft and both of the said positive clutches, substantially as set forth.

23. In a traction engine gearing, the combination of the engine shaft, the sleeve thereon, the gear wheel loose on the sleeve, the gear wheel rigid with the sleeve, the supplemental shaft, the gear wheel fixed to the supplemental shaft, the gear wheel loose thereon, the two oppositely acting positive clutches, one on the sleeve and one on the supplemental shaft, and the friction clutch interposed between the engine shaft and the positive clutches, substantially as set forth.

24. In a traction engine gearing, the combination of the engine shaft, the traction gear, the high speed power transmitting gearing for driving the traction gear from the engine shaft, the supplemental low speed gearing adapted to be driven from the engine shaft and to drive one of the elements of the said high speed gearing, separable connections between the said element of the high speed gearing and the engine shaft, separable connections between one of the elements of the low speed gearing and the engine shaft, and means for shifting both of said separable connections into and out of operative position.

25. In a traction engine gearing, the combination of the engine shaft, the traction gear, the high speed power transmitting gearing for driving the traction gear from the engine shaft, the supplemental low speed gearing adapted to be driven from the engine shaft and to drive one of the elements of the said high speed gearing, separable connections between the said element of the high speed gearing and the engine shaft, separable connections between one of the elements of the low speed gearing and the engine shaft, and means for simultaneously shifting said separable connections, one into and the other out of operative position.

In testimony whereof I affix my signature in presence of two witnesses.

JOHN B. BARTHOLOMEW.

Witnesses:
 ELVAN M. VOORHEES,
 W. C. MAGE.